(12) United States Patent
Shelestak et al.

(10) Patent No.: US 8,440,583 B2
(45) Date of Patent: May 14, 2013

(54) BLUE GLASS COMPOSITION

(75) Inventors: Larry J. Shelestak, Bairdford, PA (US); Mehran Arbab, Pittsburgh, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 321 days.

(21) Appl. No.: 12/788,810

(22) Filed: May 27, 2010

(65) Prior Publication Data

US 2011/0291436 A1 Dec. 1, 2011

(51) Int. Cl.
*C03C 3/095* (2006.01)
*C03C 3/087* (2006.01)

(52) U.S. Cl.
USPC .................................. 501/64; 501/70; 501/71

(58) Field of Classification Search .................... 501/64, 501/70, 71
See application file for complete search history.

(56) References Cited

U.S. PATENT DOCUMENTS

| | | | |
|---|---|---|---|
| 4,381,934 A | 5/1983 | Kunkle et al. | |
| 4,792,536 A | 12/1988 | Pecoraro et al. | |
| 4,886,539 A | 12/1989 | Gerutti et al. | |
| 5,264,400 A * | 11/1993 | Nakaguchi et al. | 501/71 |
| 5,792,559 A | 8/1998 | Heithoff et al. | |
| 5,833,729 A | 11/1998 | Meunier et al. | |
| 5,837,629 A | 11/1998 | Combes et al. | |
| 5,851,940 A | 12/1998 | Boulos et al. | |
| 5,858,047 A | 1/1999 | Frank et al. | |
| 6,076,373 A | 6/2000 | Grodziski | |
| 6,656,862 B1 | 12/2003 | Krumwiede et al. | |
| 6,953,758 B2 | 10/2005 | Arbab et al. | |
| 6,979,662 B1 | 12/2005 | Coster et al. | |
| 7,504,350 B2 | 3/2009 | Coster et al. | |
| 7,560,404 B2 | 7/2009 | Shelestak et al. | |
| 7,585,801 B2 | 9/2009 | Shelestak | |
| 7,625,830 B2 | 12/2009 | Shelestak et al. | |
| 7,659,221 B2 | 2/2010 | Arbab et al. | |
| 7,666,806 B2 | 2/2010 | Shelestak et al. | |
| 2003/0114290 A1 | 6/2003 | Landa et al. | |
| 2005/0170944 A1 * | 8/2005 | Arbab et al. | 501/64 |
| 2006/0178255 A1 | 8/2006 | Shelestak et al. | |
| 2007/0037687 A1 | 2/2007 | Thomsen et al. | |
| 2007/0243993 A1 | 10/2007 | Heithoff et al. | |
| 2008/0090718 A1 * | 4/2008 | Landa et al. | 501/64 |

OTHER PUBLICATIONS

PCT International Search Report for International Application No. PCT/US2011/037830.

* cited by examiner

*Primary Examiner* — Karl Group
*Assistant Examiner* — Elizabeth A Bolden
(74) *Attorney, Agent, or Firm* — Andrew C. Siminerio

(57) ABSTRACT

A blue colored, infrared and ultraviolet absorbing glass composition uses a standard soda-lime-silica glass base composition and additionally iron, cobalt, and additional colorants selected from the group of $Er_2O_3$, $Cr_2O_3$, CuO, NiO, $TiO_2$, $Nd_2O_3$ and combinations thereof. The glass of the present invention has a luminous transmittance of up to 60 percent, a dominant wavelength in the range of 480 to 489 nanometers and an excitation purity of at least 8 percent at a thickness of 0.160 inches (4.06 millimeters). The glass composition can form transparent glass panels that have varying limited LTA from one another as panel sets for mounting in automobiles.

18 Claims, No Drawings

BLUE GLASS COMPOSITION

1. FIELD OF THE INVENTION

This invention relates to a blue colored soda-lime-silica glass having a limited luminous transmittance of less than 70 percent that makes it desirable for use as a medium luminous transmittance glazing in vehicles and buildings, and more particularly, to a blue colored soda-lime-silica glass that excludes selenium as a colorant.

2. DISCUSSION OF PRESENTLY AVAILABLE BLUE GLASSES

Various blue colored glass compositions are known in the art. As used herein, the term "blue colored" is meant to include glasses that have a dominant wavelength of 479 to 495 nanometers (nm.) and preferably 480 to 491 nm. The blue colored glasses in the dominant wavelength range of 479 to 495 can also be characterized as blue-green or blue-gray in color. Generally in the CIELAB color system, which is described in more detail below, blue gives a negative value for both a* and b*.

In addition, the blue glasses of interest in the present discussion, exhibit comparable or lower infrared and ultraviolet radiation transmittance when compared to typical blue glasses used in automotive and architectural applications, and are compatible with float glass manufacturing methods. The term "transparent" as used herein means having a visible light transmittance of greater than 0% to be distinguished over "opaque" which has a visible light transmittance of 0%.

Blue colored, infrared and ultraviolet absorbing glasses of particular interest in the present discussion are of the type disclosed in U.S. Pat. Nos. 6,656,862 and 6,953,758 B2, which patents in their entirety are hereby incorporated by reference. The primary colorants in the glasses of the types disclosed in U.S. Pat. Nos. 6,656,862 and 6,953,758 B2 are iron, which is present in both the ferric ($Fe_2O_3$) and ferrous (FeO) forms, cobalt oxide (CoO), selenium (Se) and optionally titanium oxide ($TiO_2$) and neodymium oxide ($Nd_2O_3$). Although the blue colored, infrared and ultraviolet glasses presently available are commercially acceptable, there is the limitation of using Se to obtain the blue color. More particularly, Se has a low melting point, e.g. about 423 degrees Fahrenheit (° F.) (217 degrees Celsius (° C.)) and a high vapor pressure. It is expected that 80-85% of the Se added to the glass batch materials is carried out of the glass melter in the exhaust gases during the heating of the glass batch materials.

As can now be appreciated it would be advantageous to provide blue colored, infrared and ultraviolet absorbing glasses that do not use selenium as a colorant.

SUMMARY OF THE INVENTION

This invention relates to a blue colored, infrared and ultraviolet radiation absorbing glass substrate including, among other things, a glass composition including, among other things a base glass portion and a glass colorant portion, wherein the base glass portion is a soda-lime-silica base portion, and the glass colorant portion is selected from one of the following groups to provide a glass having chromaticity coordinates of a* in the range of −2 to −11 and b* in the range of −1 to −15, and a luminous transmittance of 35 to less than 70%, at a reference thickness of 0.160 inch (4.06 mm):

Group A: the colorant portion includes, among other things:
total iron, expressed as $Fe_2O_3$, in the range of 0.60 to 2.0 weight percent (wt %);
CoO in the range of 30 to 250 parts per million (ppm);
$Er_2O_3$ in the range of 0.01 to 3 wt %;
$TiO_2$ in the range of 0 to 0.9 wt %, and
$Nd_2O_3$ in the range of 0 to 3 wt %;

Group B: the colorant portion includes, among other things:
total iron, expressed as $Fe_2O_3$, in the range of 0.60 to 2.0 wt %;
CoO in the range of 30 to 250 ppm;
$Er_2O_3$ in the range of 0.01 to 3 wt %;
$Cr_2O_3$ in the range of 5 to 200 ppm;
$TiO_2$ in the range of 0 to 0.9 wt %, and
$Nd_2O_3$ in the range of 0 to 3 wt %;

Group C: the colorant portion includes, among other things:
total iron, expressed as $Fe_2O_3$, in the range of 0.60 to 2.0 wt %;
CoO in the range of 30 to 250 ppm;
$Er_2O_3$ in the range of 0.01 to 3 wt %;
$Cr_2O_3$ in the range of 5 to 200 ppm;
CuO in the range of 0.001 to 0.3 wt %;
$TiO_2$ in the range of 0 to 0.9 wt %, and
$Nd_2O_3$ in the range of 0 to 3 wt %, and Group D: the colorant portion includes, among other things:
total iron, expressed as $Fe_2O_3$, in the range of 0.60 to 2.0 wt %;
CoO in the range of 30 to 250 ppm;
$Er_2O_3$ in the range of 0.01 to 3 wt %;
NiO in the range of 1 to 100 ppm;
$TiO_2$ in the range of 0 to 0.9 wt %, and
$Nd_2O_3$ in the range of 0 to 3 wt %;
wherein the wt % and the ppm are based on the final glass composition.

This invention also relates to a blue colored, infrared and ultraviolet radiation absorbing glass composition having a composition including, among other things a base glass portion selected from one of the following Groups:

Group 1: the base portion includes, among other things:

| | Weight Percent |
|---|---|
| $SiO_2$ | 66 to 75; |
| $Na_2O$ | 10 to 20; |
| CaO | 5 to 15; |
| MgO | 0 to 5; |
| $Al_2O_3$ | 0 to 5, |
| $K_2O$ | 0 to 5, and |

Group 2: the base portion includes, among other things:

| | Weiqht Percent |
|---|---|
| $SiO_2$ | 66 to 75; |
| $Na_2O$ | 10 to 20; |
| CaO | 5 to 15; |
| MgO | 0 to 5; |
| $Al_2O_3$ | 0 to 5; |
| $K_2O$ | 0 to 5, and |
| $B_2O_3$ | greater than 0 to 5; | and a primary solar radiation absorbing and colorant portion selected from one of the following Groups:

Group A: the colorant portion consists essentially of:
total iron, expressed as $Fe_2O_3$, in the range of 0.60 to 2.0 weight percent (wt %);
CoO in the range of 30 to 250 ppm;
$Er_2O_3$ in the range of 0.01 to 3 wt %;
$TiO_2$ in the range of 0 to 0.9 wt %, and
$Nd_2O_3$ in the range of 0 to 3 wt %;

Group B: the colorant portion consists essentially of:
total iron, expressed as $Fe_2O_3$, in the range of 0.60 to 2.0 wt %;
CoO in the range of 30 to 250 ppm;
$Er_2O_3$ in the range of 0.01 to 3 wt %;
$Cr_2O_3$ in the range of 5 to 200 ppm;
$TiO_2$ in the range of 0 to 0.9 wt %, and
$Nd_2O_3$ in the range of 0 to 3 wt %;

Group C: the colorant portion consists essentially of:
total iron, expressed as $Fe_2O_3$, in the range of 0.60 to 2.0 wt %;
CoO in the range of 30 to 250 ppm;
$Er_2O_3$ in the range of 0.01 to 3 wt %;
$Cr_2O_3$ in the range of 5 to 200 ppm;
CuO in the range of 0.001 to 0.3 wt %;
$TiO_2$ in the range of 0 to 0.9 wt %, and
$Nd_2O_3$ in the range of 0 to 3 wt %, and Group D: the colorant portion consists essentially of:
total iron, expressed as $Fe_2O_3$, in the range of 0.60 to 2.0 wt %;
CoO in the range of 30 to 250 ppm;
$Er_2O_3$ in the range of 0.01 to 3 wt %,
NiO in the range of 1 to 100 ppm;
$TiO_2$ in the range of 0 to 0.9 wt %, and
$Nd_2O_3$ in the range of 0 to 3 wt %;

wherein the glass having a redox in the range of 0.15 to 0.58, wherein at a redox range from 0.15 to 0.4, the range of CoO is from 60 to 250 PPM, and wherein at a redox range greater than 0.4, the CoO is in the range of 30 to 100 PPM, and wherein at a thickness of 0.160 inches, the glass has a luminous transmittance (LTA) of 35% up to 70%; a color characterized by a dominant wavelength in the range of 482 to 487 nanometers and an excitation purity ranging from 8 to 30 percent; a total solar ultraviolet transmittance (TSUV) of 40 percent or less; a total solar infrared transmittance (TSIR) of 25 percent or less; and a total solar energy (TSET) transmittance of 40 percent or less.

Still further, this invention relates to a blue colored, infrared and ultraviolet radiation absorbing glass composition having a composition including, among other things, a base glass portion selected from one of the following Groups:

Group 1: the base portion includes, among other things:

| | Weight Percent |
|---|---|
| $SiO_2$ | 66 to 75; |
| $Na_2O$ | 10 to 20; |
| CaO | 5 to 15; |
| MgO | 0 to 5; |
| $Al_2O_3$ | 0 to 5, |
| $K_2O$ | 0 to 5, and |

Group 2: the base portion includes, among other things:

| | Weight Percent |
|---|---|
| $SiO_2$ | 66 to 75; |
| $Na_2O$ | 10 to 20; |
| CaO | 5 to 15; |
| MgO | 0 to 5; |
| $Al_2O_3$ | 0 to 5; |
| $K_2O$ | 0 to 5, and |
| $B_2O_3$ | greater than 0 to 5; | and a primary solar radiation absorbing and colorant portion selected from one of the following Groups:

Group A consists essentially of:
total iron, expressed as $Fe_2O_3$, in the range of 0.60 to 2.0 weight percent (wt %);
CoO in the range of 30 to 250 ppm;
$Er_2O_3$ in the range of 0.01 to 3 wt %;
$TiO_2$ in the range of 0 to 0.9 wt %, and
$Nd_2O_3$ in the range of 0 to 3 wt %;

Group B consists essentially of:
total iron, expressed as $Fe_2O_3$, in the range of 0.60 to 2.0 wt %;
CoO in the range of 30 to 250 ppm;
$Er_2O_3$ in the range of 0.01 to 3 wt %;
$Cr_2O_3$ in the range of 5 to 200 ppm;
$TiO_2$ in the range of 0 to 0.9 wt %, and
$Nd_2O_3$ in the range of 0 to 3 wt %;

Group C consists essentially of:
total iron, expressed as $Fe_2O_3$, in the range of 0.60 to 2.0 wt %;
CoO in the range of 30 to 250 ppm;
$Er_2O_3$ in the range of 0.01 to 3 wt %;
$Cr_2O_3$ in the range of 5 to 200 ppm;
CuO in the range of 0.001 to 0.3 wt %;
$TiO_2$ in the range of 0 to 0.9 wt %, and
$Nd_2O_3$ in the range of 0 to 3 wt %, and Group D consists essentially of:
total iron, expressed as $Fe_2O_3$, in the range of 0.60 to 2.0 wt %;
CoO in the range of 30 to 250 ppm;
$Er_2O_3$ in the range of 0.01 to 3 wt %,
NiO in the range of 1 to 100 ppm;
$TiO_2$ in the range of 0 to 0.9 wt %, and
$Nd_2O_3$ in the range of 0 to 3 wt %;

wherein the glass has a redox in the range of 0.15 to 0.58, wherein at a redox range from 0.15 to 0.4, the range of CoO is from 60 to 250 PPM, and wherein at a redox range greater than 0.4, the CoO is in the range of 30 to 100 PPM, and wherein at a thickness of 0.160 inches, the glass has a luminous transmittance (LTA) of 35% up to 60%; a color characterized by a dominant wavelength in the range of 482 to 487 nanometers and an excitation purity ranging from 8 to 20 percent; a total solar ultraviolet transmittance (TSUV) of 40 percent or less; a total solar infrared transmittance (TSIR) of 25 percent or less; and a total solar energy (TSET) transmittance of 45 percent or less.

DETAILED DESCRIPTION OF THE INVENTION

Unless otherwise indicated, all numbers expressing quantities of ingredients, conditions and so forth used in the specification and claims are to be understood as being modified in all instances by the term "about". For example, for gross units by "about" it is meant plus or minus (+/−) 50%, preferably +/−40%, more preferably +/−25%, even more preferably +/−10%, still more preferably +/−5%, and most preferably is the reported value or a value in the stated range. Additionally, any numeric reference to amounts, unless otherwise specified, is "by weight percent". Also, unless indicated to the contrary, the numerical values set forth in the following specification and claims are approximations that can vary depending upon the desired properties sought to be obtained by the present invention. At the very least, and not as an attempt to limit the application of the doctrine of equivalents to the scope of the claims, each numerical value should at least be construed in light of the number of reported significant digits and by applying ordinary rounding techniques. Moreover, all ranges disclosed herein are to be understood to encompass any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more and ending with a maximum value of 10 or less, e.g., 5.5 to 10.

As used herein, the terms "solar control" and "solar control properties" mean properties which affect the solar properties, e.g., visible, infrared ("IR") or ultraviolet ("UV") transmittance and/or reflectance of the glass.

In one non-limiting embodiment of the invention, the base glass of the present invention, that is, the major glass forming constituents or ingredients of the glass that don't function as the primary infrared or ultraviolet absorbing materials and/or colorants, which are an object of the present invention, is commercial soda-lime-silica glass typically characterized as follows:

| Ingredient | Weight Percent |
| --- | --- |
| $SiO_2$ | 66 to 75 |
| $Na_2O$ | 10 to 20 |
| CaO | 5 to 15 |
| MgO | 0 to 5 |
| $Al_2O_3$ | 0 to 5 |
| $K_2O$ | 0 to 5 |

As used herein, all "weight percent" (herein after also referred to as "wt %") values are based on the total weight of the final glass composition.

In another non-limiting embodiment of the invention, the base glass of the present invention is soda-lime-silica glass characterized as follows:

| Ingredient | Weight Percent |
| --- | --- |
| $SiO_2$ | 66 to 75 |
| $Na_2O$ | 10 to 20 |
| CaO | 5 to 15 |
| MgO | 0 to 5 |
| $Al_2O_3$ | 0 to 5 |
| $K_2O$ | 0 to 5 |
| $B_2O_3$ | greater than 0 to 5 |

In this embodiment of the invention, $B_2O_3$ is added to improve the durability of glass and/or as an aid to enhance the melting of the ingredients of the base soda-lime-silica glass.

To this base glass, the present invention adds at least a primary (predominant or major) infrared and ultraviolet radiation absorbing materials and colorants in the form of iron and cobalt, and colorants selected from the group of erbium, chromium, copper, nickel, titanium, neodymium and combinations thereof, e.g. but not limited to erbium and chromium and/or copper and nickel and/or titanium and neodymium. As disclosed herein with respect to the glass compositions, iron is expressed in terms of ferric iron ($Fe_2O_3$) and ferrous iron (FeO), cobalt is expressed in terms of cobalt oxide (CoO), erbium is expressed in terms of erbium oxide ($Er_2O_3$), chromium is expressed in terms of chromium oxide ($Cr_2O_3$), copper is expressed in terms of copper oxide (CuO), nickel is expressed in terms of nickel oxide (NiO), titanium is expressed in terms of titanium oxide ($TiO_2$) and neodymium is expressed in terms of neodymium oxide ($Nd_2O_3$). Based on the forgoing, the colorants are also selected from the group of erbium oxide ($Er_2O_3$), chromium oxide ($Cr_2O_3$), copper oxide (CuO), nickel oxide (NiO), titanium oxide ($TiO_2$), neodymium oxide ($Nd_2O_3$) and combinations thereof, e.g. but not limited to erbium oxide and copper oxide and/or chromium oxide and nickel oxide and/or erbium oxide, titanium oxide and neodymium oxide.

It should be appreciated that the glass compositions disclosed herein can include small amounts of other materials, for example, melting and refining aids, tramp materials or impurities, or minor colorants or infrared and/or ultraviolet radiation absorbing materials. It should be further appreciated that in one embodiment of the invention, small amounts of additional materials can be included in the glass to provide the desired color characteristics and improve the solar performance of the glass, as will be discussed later in more detail.

The iron oxides in a glass composition perform several functions. Ferric oxide, $Fe_2O_3$, is a strong ultraviolet radiation absorber and operates as a yellow colorant in the glass. Ferrous oxide, FeO, is a strong infrared radiation absorber and operates as a blue colorant in the glass. The total amount of iron present in the glasses disclosed herein is expressed in terms of $Fe_2O_3$ in accordance with standard analytical practice but that does not imply that all of the iron is actually in the form of $Fe_2O_3$. Likewise, the amount of iron in the ferrous state is reported as FeO even though it may not actually be present in the glass as FeO. In order to reflect the relative amounts of ferrous and ferric iron in the glass compositions disclosed herein, the term "redox" is used. The term "redox" as used herein shall mean the amount of iron in the ferrous state expressed as FeO divided by the amount of total iron expressed as $Fe_2O_3$. Furthermore, unless stated otherwise, the term "total iron" as used herein shall mean total iron ($Fe_2O_3$ plus FeO) expressed in terms of $Fe_2O_3$ and the term "FeO" shall mean iron in the ferrous state expressed in terms of FeO.

Cobalt oxide (CoO) operates as a blue colorant and does not exhibit any appreciable infrared or ultraviolet radiation absorbing properties. Erbium oxide ($Er_2O_3$) operates as a pink colorant and absorbs infrared radiation. Chromium oxide ($Cr_2O_3$) operates as a green colorant and absorbs ultraviolet radiation, Copper oxide (CuO) operates as a blue colorant and absorbs infrared radiation. Nickel oxide (NiO) operates as a brown colorant, and does not exhibit any appreciable infrared or ultraviolet radiation absorbing properties. Titanium oxide ($TiO_2$) operates as yellow colorant and absorbs ultraviolet radiation. Neodymium oxide ($Nd_2O_3$) operates as a violet colorant and absorbs infrared radiation. A proper balance between the iron, i.e. ferric and ferrous oxides, cobalt, and the colorants erbium oxide ($Er_2O_3$), chromium oxide ($Cr_2O_3$), copper oxide (CuO), nickel oxide (NiO), titanium oxide ($TiO_2$) and neodymium oxide ($Nd_2O_3$) is required to obtain the desired blue colored glass with the desired spectral properties discussed below.

In the practice of the invention, selected amounts of the primary infrared and ultraviolet radiation absorbing materials and colorants are added to the ingredients of the basic glass to provide a glass composition having a medium luminous transmission (LTA), e.g. having an LTA from 35 to 65 percent and more suitably from 40 to 60 percent and even more suitably from 45 to 55 percent for glass thickness of 4.1 mm. (0.160 inch). The primary infrared and ultraviolet radiation absorbing materials and colorants have specific ranges of amounts. In one embodiment of the invention, the total iron ($Fe_2O_3$ and FeO) generally ranges from 0.65 to 2.0 weight percent (wt %) and more suitably from 0.9 wt % to 1.3 wt %, more particularly from 0.9 wt % to 1.1 wt %. The cobalt oxide (COO) in the glass ranges from 30 to 250 parts per million (ppm). When the redox value ranges from 0.15 to 0.4, the amount of cobalt oxide in the glass can be present in an amount from 60 to 250 ppm. When the redox value ranges from 0.4 to 0.58, or from 0.4 to 0.55, the amount of cobalt oxide in the glass can range from 30 to 130 ppm, more suitably from 30 to 95 ppm and most suitably from 30 to 90 ppm.

For certain non-limiting embodiments of the invention, the balance of the iron oxides and cobalt oxide to achieve the blue color having a dominant wavelength in the range of 479 to 495 nanometers (nm), and more suitably 480 to 491 nm can involve having an amount of cobalt oxide at a higher amount in the stated range such as greater than 89 to 130 ppm when the amount of total iron is in the lower portion of the range for instance 0.65 to 0.9 wt %. Likewise when the amount of total iron is in the upper portion of the range such as from greater than 0.9, the amount of cobalt oxide can be present from 60 up to 130 ppm or even more suitably from 60 to 95 ppm.

In general, the amounts of total iron and cobalt oxide determine the preferred spectral properties and blue color of the glass. Furthermore, the colorants erbium oxide ($Er_2O_3$), chromium oxide ($Cr_2O_3$), copper oxide (CuO), nickel oxide (NiO), titanium oxide ($TiO_2$) and neodymium oxide ($Nd_2O_3$) provide a further alteration of the color of the glass composition to attain the desired spectral properties and dominant wavelength, purity and L*, a* and b* values. The amounts of the colorants erbium oxide ($Er_2O_3$), chromium oxide ($Cr_2O_3$), copper oxide (CuO), nickel oxide (NiO), titanium oxide ($TiO_2$) and neodymium oxide ($Nd_2O_3$) depend on the colorant or combination of colorants used. More particularly, erbium oxide ($Er_2O_3$) is a colorant that can be used alone in combination with the iron and cobalt oxide to obtain a glass having the properties of the invention. When the erbium oxide ($Er_2O_3$) is used alone in combination with the iron and cobalt oxide, it is preferably in the range of 0.01 to 3 wt %, more preferably in the range of 0.05 to 1 wt %, and most preferably in the range of 0.1 to 0.5 wt %. Chromium oxide ($Cr_2O_3$), in the practice of the invention, is not used alone in combination with iron and cobalt oxide to obtain a glass having the properties of the invention. When the chromium oxide ($Cr_2O_3$) is used in combination with the iron and cobalt oxide, it is preferably mixed with erbium oxide ($Er_2O_3$), or mixed with a combination of erbium oxide ($Er_2O_3$) and copper oxide (CuO), to obtain a glass having the properties of the invention. Table 1 below provides the ranges of chromium oxide ($Cr_2O_3$) when used in combination with erbium oxide ($Er_2O_3$), and with a mixture of erbium oxide ($Er_2O_3$) and copper oxide (CuO).

TABLE 1

| Colorants | Preferred Range | More Preferred Range | Most Preferred Range |
| --- | --- | --- | --- |
| ($Er_2O_3$) & ($Cr_2O_3$) | | | |
| ($Er_2O_3$) | 0.01 to 3 wt % | 0.05 to 1 wt % | 0.1 to 0.5 wt % |
| ($Cr_2O_3$) | 5 to 200 ppm | 10 to 100 ppm | 20 to 75 ppm |
| ($Er_2O_3$) & ($Cr_2O_3$) & (CuO) | | | |
| ($Er_2O_3$) | 0.01 to 3 wt % | 0.05 to 1 wt % | 0.1 to 0.5 wt % |
| ($Cr_2O_3$) | 5 to 200 ppm | 10- to 100 ppm | 20 to 50 ppm |
| (CuO) | 0.001 to 0.3% | 0.01 to 0.2% | 0.02 to 0.1% |

Nickel oxide (NiO) in the practice of the invention is not used alone in combination with iron and cobalt oxide to obtain a glass having the properties of the invention. When the nickel oxide (NiO) is used in combination with the iron and cobalt oxide, it is preferably mixed with erbium oxide ($Er_2O_3$). Table 2 below provides the ranges of Nickel oxide (NiO) and erbium oxide ($Er_2O_3$) when used together with iron and cobalt oxide to obtain the glasses of the invention.

TABLE 2

| Colorants ($Er_2O_3$) & (NiO) | Preferred Range | More Preferred Range | Most Preferred Range |
| --- | --- | --- | --- |
| ($Er_2O_3$) | 0.01 to 3 wt % | 0.05 to 1 wt % | 0.1 to 0.5 wt % |
| (NiO) | 1 to 100 ppm | 5 to 50 ppm | 10 to 30 ppm |

Optionally, titanium oxide ($TiO_2$) and neodymium oxide ($Nd_2O_3$) are used in combination with erbium oxide ($Er_2O_3$), chromium oxide ($Cr_2O_3$), copper oxide (CuO) and/or nickel oxide NiO) and are discussed in more detail below.

As can be appreciated, tramp amounts of erbium oxide ($Er_2O_3$), chromium oxide ($Cr_2O_3$), copper oxide (CuO), nickel oxide (NiO), titanium oxide ($TiO_2$) and neodymium oxide ($Nd_2O_3$) can be present in the glass and for purposes of the invention are not considered as contributing to the color properties of the glass. More particularly, amounts of erbium oxide ($Er_2O_3$) less than 0.01 wt %, chromium oxide ($Cr_2O_3$) less than 5 ppm, copper oxide (CuO) less than 10 ppm, nickel oxide (NiO) less than 1 ppm, titanium oxide ($TiO_2$) less than 0.02 wt % and neodymium oxide ($Nd_2O_3$) less than 0.01 wt % are considered tramp amounts and are not considered to add to the color and/or spectral properties of the glass composition.

Other additional colorants which result in minor coloration effects that can optionally be present include: tin, vanadium, manganese, zinc, molybdenum, cerium, tungsten, lanthanum and mixtures thereof in minor amounts, e.g. less than 0.02 wt %. At an amount of less than 0.02 wt %, the foregoing additional colorants are considered tramp amounts and are not considered primary colorants. The amounts of these additional colorants for the minor coloration effect are such that the total amount of these materials would not alter the dominant wavelength to be outside the desired range of the dominant wavelength, purity and L*, a* and b* color coordinates of the invention. In one embodiment of the invention, the total amount of these additional colorants is generally less than 2 wt %, and preferably less than 1 wt %. Most preferably the glass composition is essentially free of colorants other than the primary colorants to avoid even the minor coloration effects. The glass composition of the present invention is most preferably essentially free of materials added to the batch to result in the glass composition having fluorine, and oxides of zirconium, cerium, and barium in more than tramp or trace amounts.

The glasses of the present invention can be melted and refined in a continuous, large-scale, commercial glass melting operation and formed into flat glass sheets of varying thickness by the float process in which the molten glass is supported on a pool of molten metal, usually tin, as it assumes a ribbon shape and is cooled, in a manner well known in the art.

Although it is preferred that the glass disclosed herein be made using a conventional, overhead fired continuous melting operation, as is well known in the art, the glass can also be produced using a multi-stage melting operation, as disclosed in U.S. Pat. Nos. 4,381,934 to Kunkle, et al., 4,792,536 to Pecoraro, et al. and 4,886,539 to Cerutti, et al., which patents in their entirety are hereby incorporated by reference. If required, a stirring arrangement can be employed within the melting and/or forming stages of the glass production operation to homogenize the glass in order to produce glass of the highest optical quality.

Depending on the type of melting operation, sulfur can be added to the batch materials of a soda-lime-silica glass as a melting and refining aid. Commercially produced float glass can include up to about 0.5 wt. % $SO_3$. In a glass composition that includes iron and sulfur, providing reducing conditions can create amber coloration which lowers luminous transmittance as discussed in U.S. Pat. No. 4,792,536 to Pecoraro, et al. Increasing the FeO content enables the absorption of glass in the infrared to be increased and the TSET to be reduced. However, when glass is manufactured in the presence of sulfur in highly reducing conditions, it can take on an amber color due to the formation of chromophores resulting from the reaction between sulfur and ferric iron. However, it is further believed that the reducing conditions required to produce this coloration in float glass compositions of the type disclosed herein for low redox systems are limited to approximately the first 20 microns of the lower glass surface contacting the molten tin during the float forming operation, and to a lesser extent, to the exposed upper glass surface. Because of the glass' low sulfur content (generally less than 0.3 weight percent) and the limited region of the glass in which any coloration could occur, depending on the particular soda-lime-silica glass composition, sulfur in these surfaces would not be a primary colorant. In other words, the absence of the iron sulfur chromophores would not result in the dominant wavelength for the colored glass going beyond the desired range of wavelength for the desired color for low redox conditions. Hence, these chromophores have little if any material effect on the glass color or spectral properties at low redox, i.e., below about 0.35. At high redox, i.e., above about 0.35, chromophores of iron polysulfides can form in the bulk glass itself. For example, for redox ratios greater than or equal to about 0.4, up to about 10 ppm of iron polysulfides might be present. This amount can provide a measurable change of dominant wavelength of less than one nm but not more than 2 or 3 nm. In any event such an effect can be compensated for with the components of the primary infrared and ultraviolet radiation absorbing and colorant portion to maintain the glass in the desired range of dominant wavelength.

It should be appreciated that as a result of forming the glass on molten tin as discussed above, measurable amounts of tin oxide can migrate into surface portions of the glass on the side contacting the molten tin. Typically, a piece of float glass has a tin oxide ($SnO_2$) concentration ranging from about 0.05 to 2 wt % in about the first 25 microns below the surface of the glass that was in contact with the tin. Typical background levels of $SnO_2$ can be as high as 30 PPM. It is believed that high tin concentrations in about the first 10 angstroms of the glass surface supported by the molten tin may slightly increase the reflectivity of that glass surface; however, the overall impact on the optical properties of the glass is minimal.

Table 3 illustrates a series of computer modeled glass compositions embodying the principles of the present invention. The modeled compositions were generated by a glass color and spectral performance computer model developed by PPG Industries, Inc. Table 3 lists only the iron, cobalt, selenium, erbium, copper, nickel, titanium and redox portions of the examples. In addition, several of the modeled compositions were modeled to include 4 ppm $Cr_2O_3$, to account for tramp material effects. It is believed that glass compositions of the instant invention produced by a commercial float process as discussed earlier can include low levels of $Cr_2O_3$, $MnO_2$ and less than 0.020 weight percent $TiO_2$, but these levels of such materials are considered to be tramps levels which would not materially affect the color characteristics and spectral properties of the blue glass of the present invention.

TABLE 3

|  | prior art Ex. 1 | Ex. 2 | Ex. 3 | Ex. 4 | Ex. 5 | Ex. 6 |
|---|---|---|---|---|---|---|
| total iron (%) | 0.869 | 0.880 | 0.855 | 0.860 | 0.880 | 0.880 |
| FeO (%) | 0.212 | 0.215 | 0.209 | 0.210 | 0.215 | 0.215 |
| Model redox | 0.244 | 0.244 | 0.244 | 0.244 | 0.244 | 0.244 |
| CoO (ppm) | 114 | 115 | 111 | 113 | 112 | 114 |
| Se (ppm) | 1 |  |  |  |  |  |
| NiO (ppm) |  |  |  |  | 18 |  |
| Cr2O3 (ppm) | 4 | 4 | 25 | 50 | 4 | 4 |
| TiO2 (%) | 0.010 | 0.120 | 0.100 | 0.040 | 0.020 | 0.100 |
| Er2O3 (%) |  | 0.135 | 0.290 | 0.260 | 0.160 | 0.130 |
| CuO (%) |  |  | 0.030 |  |  |  |
| Lta (%) | 49.86 | 49.75 | 49.78 | 49.79 | 49.85 | 49.96 |
| TSUV (%) | 37.39 | 35.86 | 36.18 | 37.13 | 37.14 | 36.15 |
| TSIR (%) | 23.57 | 23.16 | 23.54 | 23.84 | 23.05 | 23.16 |
| TSET (%) | 38.17 | 37.86 | 37.93 | 38.24 | 37.91 | 37.97 |
| DW (nm) | 482.90 | 482.92 | 482.98 | 483.02 | 482.94 | 482.92 |
| Pe (%) | 16.25 | 16.21 | 16.16 | 16.16 | 16.15 | 16.24 |
| L* | 78.10 | 78.03 | 78.04 | 78.04 | 78.09 | 78.17 |
| a* | −8.19 | −8.21 | −8.19 | −8.21 | −8.19 | −8.24 |
| b* | −12.05 | −11.97 | −11.92 | −11.92 | −11.94 | −12.01 |

The spectral properties shown for Table 3 are based on a reference thickness of 0.160 inches (4.06 mm). It should be appreciated that the spectral properties of the examples can be approximated at different thicknesses using the formulas disclosed in U.S. Pat. No. 4,792,536. The disclosure of U.S. Pat. No. 4,792,536 in its entirety is incorporated herein by reference.

With respect to the spectral data and color data provided in Table 3, the values were computer generated and are expected to match measurements made on glass samples having thickness of 0.160 inches (4.06 mm) and having the same composition using the following measuring procedures. The luminous transmittance (LTA) is measured using C.I.E. standard illuminant "A" with a 2° observer over the wavelength range of 380 to 770 nanometers. Glass color, in terms of dominant wavelength and excitation purity, is measured using C.I.E. standard illuminant "C" with a 2° observer, following the procedures established in ASTM E308-90. Glass color in terms of L*, a* and b*, are calculated from the tristimulus values (X, Y, Z) and identify the characteristics of lightness and hue, respectively, in the system commonly referred to as the CIELAB color system. The lightness, or value, distinguishes the degree of lightness or darkness and L* indicates the lightness or darkness of the color and represents the lightness plane on which the color resides. Hue distinguishes colors such as red, yellow, green and blue. The symbol "a*" indicates the position of the color on a red (+a*) green (−a*) axis. The symbol "b*" indicates the color position on a yellow (+b*) blue (−b*) axis. It should be appreciated that color can be characterized in any of these color systems and one skilled in the art may calculate equivalent DW and Pe values; L*, a*, b* values from the transmittance curves of the viewed glass or composite transparency. The L*, a*, and b* values are determined using the reference illuminant (D65) and a Lambda 9 spectrophotometer, commercially available from Perkin-Elmer Corporation. A detailed discussion of color calculations is given in U.S. Pat. No. 5,792,559. The disclosure of U.S. Pat. No. 5,792,559 in its entirety is incorporated herein by reference.

The transmitted color spectrum of the glass can be converted to a color, i.e. chromaticity coordinates, using the method disclosed in ASTM E 308-85 for a D65 illuminant and a standard observer of CIE 1964 (10°) observer. The total solar ultraviolet transmittance (TSUV) is measured over the wavelength range of 300 to 400 nm, total solar infrared transmittance (TSR) is measured over the wavelength range of 775 to 2125 nm, and total solar energy transmittance (TSET) is measured over the wavelength range of 275 to 2125 nm. The TSUV, TSIR and TSET transmittance data are calculated using Parry Moon air mass 2.0 direct solar irradiance data and integrated using the Trapezoidal Rule, as is known in the art.

Sample Preparation

As given in Table 4, the following examples illustrate glass compositions that embody the present invention based on experimental laboratory glass melts. The spectral properties for Examples 7 to 12 shown in Table 4 are based on a reference thickness of 0.160 inches (4.06 mm).

TABLE 4

|  | Ex. 7 | Ex. 8 | Ex. 9 | Ex. 10 | Ex. 11 | EX. 12 |
|---|---|---|---|---|---|---|
| total iron (%) | 0.636 | 0.643 | 0.632 | 0.641 | 0.644 | 0.634 |
| FeO (%) | 0.215 | 0.195 | 0.190 | 0.171 | 0.175 | 0.169 |
| Model redox | 0.338 | 0.303 | 0.301 | 0.267 | 0.271 | 0.266 |
| CoO (ppm) | 42 | 42 | 42 | 40 | 40 | 40 |
| Se (ppm) |  |  |  |  |  |  |
| NiO (ppm) |  |  |  |  |  |  |
| Cr2O3 (ppm) | 5 | 6 | 4 | 7 | 7 | 5 |
| TiO2 (%) | 0.016 | 0.015 | 0.014 | 0.016 | 0.017 | 0.017 |
| Er2O3 (%) | 0.500 | 0.850 | 1.200 | 0.800 | 0.850 | 0.900 |
| CuO (%) |  |  |  |  |  |  |
| Lta (%) | 61.50 | 61.60 | 61.09 | 65.23 | 64.95 | 65.16 |
| TSUV (%) | 46.43 | 44.26 | 43.02 | 43.65 | 43.44 | 43.75 |
| TSIR (%) | 23.01 | 26.03 | 26.71 | 30.78 | 30.09 | 31.20 |
| TSET (%) | 42.75 | 44.50 | 44.74 | 48.34 | 47.87 | 48.62 |
| DW (nm) | 482.79 | 481.47 | 480.17 | 482.17 | 482.03 | 481.62 |
| Pe (%) | 12.11 | 11.31 | 11.22 | 8.74 | 8.82 | 8.72 |
| L* | 84.28 | 84.12 | 83.74 | 85.73 | 85.58 | 85.66 |
| a* | −6.08 | −4.40 | −3.23 | −3.83 | −3.75 | −3.44 |
| b* | −9.67 | −9.64 | −10.09 | −7.32 | −7.42 | −7.49 |

To prepare the melts, the following raw materials were mixed to produce a final glass weight of approximately 700 grams:

| Sand | 508.99 g |
| Soda ash | 166.44 g |
| Dolomite | 90.60 g |
| Limestone | 76.35 g |

| Salt cake | 2.55 g |
| Rouge | as required |
| Cobalt oxide | as required |
| Erbium oxide | as required |
| Coal | as required |

Coal was added to each melt as needed to control glass redox. A portion of the raw batch material was then placed in a silica crucible in an electric furnace and heated to 2450° F. (1343° C.) for 30 minutes. The molten batch was then heated and held at 2500° F. (1371° C.) for 30 minutes. When the batch material melted, the remaining raw materials were added to the crucible. The molten batch was then heated to 2550° F. (1399° C.) for 30 minutes and 2650° F. (1454° C.) for 30 minutes. Next, the molten glass was fritted in water, dried and reheated to 2650° F. (1454° C.) for one hour. The molten glass was fritted in water a second time, dried and reheated to 2650° F. (1454° C.) for two more hours. The molten glass was then poured out of the crucible to form a slab and annealed. Samples were cut from the slab, ground and polished for analysis.

The chemical analysis of the glass compositions (except for FeO, CoO and $Er_2O_3$) was determined using a RIGAKU 3370 X-ray fluorescence spectrophotometer. The spectral characteristics of the glass were determined on annealed samples using a Perkin-Elmer Lambda 9 UV/VIS/NIR spectrophotometer prior to tempering the glass or prolonged exposure to ultraviolet radiation, which will affect the spectral properties of the glass. The FeO content and redox were determined in a conventional manner from the spectral transmittance curve of the glass using the glass color and spectral performance computer model developed by PPG Industries, Inc. The FeO content was determined from the transmittance at 1000 nm. The total iron (as $Fe_2O_3$) was determined by x-ray fluorescence. The redox ratio was then calculated as the spectral FeO divided by the total iron (as $Fe_2O_3$). The contents of CoO and $Er_2O_3$ were based on actual amounts added to the glass.

Referring to Tables 3 and 4, the present invention provides a blue colored glass having a standard soda-lime-silica glass base composition and additionally iron, cobalt and erbium, and optionally titanium, chromium, copper, and nickel as infrared and ultraviolet radiation absorbing materials and colorants, a luminous transmittance (LTA) of greater than 20% up to 60%, and a color characterized by a dominant wavelength (DW) in the range of 480 to 489 nanometers (nm), preferably 482 to 487 nm, and an excitation purity (Pe) of at least 8%, preferably 10 to 30% and an L*, a*, b* color coordinates, preferably having a* in the range of −2 to −11 and b* in the range of −1 to −15, more preferably having a* in the range of −3 to −10 and b* in the range of −3 to −14, and most preferably having a* in the range of −6 to −9 and b* in the range of −4 to −13 at a thickness of 0.160 inches (4.06 mm). As is appreciated by those skilled in the art, the L* which indicates the lightness or darkness of the color is correlated to the LTA of the glass composition. It is anticipated that the color of the glass can vary within the dominant wavelength range, and the a* and b* color coordinate range, to provide a desired colored product of the invention.

The redox ratio for the glass is maintained between 0.15 to 0.40, preferably between 0.20 to 0.35, more preferably between 0.24 to 0.32. The glass composition also has a TSUV of no greater than 40%, preferably no greater than 30%; a TSIR of no greater than 25%, preferably no greater than 20%; and a TSET of no greater than 40%, preferably no greater than 35%.

In one particular embodiment of the invention, the glass composition includes 0.9 to 2 wt % total iron, preferably 1 to 1.4 wt % total iron, and more preferably 1.1 to 1.3 wt % total iron; 0.15 to 0.65 wt % FeO, preferably 0.2 to 0.5 wt % FeO, and more preferably 0.24 to 0.40 wt % FeO; and 90 to 250 ppm CoO, preferably 100 to 150 ppm CoO, and more preferably 110 to 140 ppm CoO. The colorants erbium oxide ($Er_2O_3$), chromium oxide ($Cr_2O_3$), copper oxide (CuO), nickel oxide (NiO), titanium oxide ($TiO_2$) and neodymium oxide ($Nd_2O_3$) are also included in the glass composition. The colorants erbium oxide ($Er_2O_3$), chromium oxide ($Cr_2O_3$), copper oxide (CuO), and nickel oxide (NiO) are included in the amounts discussed above. Titanium oxide can be included in the glass composition, and more specifically, 0 to 0.9 wt % $TiO_2$, preferably, 0 to 0.5 wt % $TiO_2$. One embodiment of the invention includes 0.02 to 0.3 wt % $TiO_2$. Neodymium oxide can be included in the glass composition in the amounts ranging from 0 to 3 wt % $Nd_2O_3$.

As can be appreciated the glass of the instant invention is selenium-free and has an LTA of greater than 20% up to 60%, and preferably greater than 35% up to 55%. In another embodiment of the invention, the glass composition is selenium-free and has less than 200 ppm CoO.

It is expected that the spectral properties of the glass will change after tempering the glass and further upon prolonged exposure to ultraviolet radiation, commonly referred to as "solarization". In particular, it is estimated that tempering and solarization of the glass compositions disclosed herein can reduce the luminous transmittance (LTA) and total solar infrared transmittance (TSIR) by about 0.5 to 1%, reduce the total solar ultraviolet transmittance (TSUV) by about 1 to 2%, and the total solar energy transmittance (TSET) by about 1 to 1.5%. As a result, in one embodiment of the invention, the glass has selected spectral properties that initially fall outside the desired ranges previously discussed but fall within the desired ranges after tempering and/or solarization.

Glass as disclosed herein and made by the float process typically ranges from a sheet thickness of about 1 millimeter to 10 millimeters.

For vehicle glazing applications, it is preferred that the glass sheets having a composition and spectral properties as disclosed herein have a thickness generally in the range of 1.5 to 10 millimeters and more particularly within the range of 0.121 to 0.197 inches (3.1 to 5 mm). It is anticipated that when using a single glass ply in the above thickness range, the glass will be tempered or laminated, e.g. for an automotive side or rear window.

It is also contemplated that the glass will have architectural applications and be used at thicknesses ranging from about 0.125 to 0.50 inches (3 to 12 mm).

When multiple plies are used for either automotive or architectural applications, it is anticipated that the glass plies will be annealed and laminated together using a thermoplastic interlayer adhesive, such as polyvinyl butyral.

The glass of the present invention as dark blue glass or medium LTA blue glass can be provided together or individually with windshields as sets of transparent panels for motor vehicles such as cars. In different parts of the world, governmental agencies with responsibility for regulating or licensing motor vehicle safety or use of highways or other public thoroughfares have prescribed minimum luminous light transmittance values for particular automotive "vision panels", such as windshields and front sidelights. For instance, United States Federal regulations require the luminous light transmittance (LTA) of automotive windshields and front sidelights to be at least 65% and preferably 70%. The luminous transmittance requirements for other automotive transparencies, such as back sidelights and rear lights of trucks and minivans, and for non-vision panels, such as sun roofs, moon roofs and the like, are typically less than those for windshields and front sidelights. Other areas of the world can have a different prescribed minimum. The glass of the present invention can be the vision panels for sidelights at the medium dark LTA or as more typical type of privacy glass for back sidelights behind the "B" pillar or as the backlight in vans and trucks.

Such sets can be fabricated from the glass of the present invention by any method known to those skilled in the art. For instance sidelights, backlights, windshields and sunroofs can be made in accordance with the descriptions of U.S. Pat. Nos. 5,858,047; 5,833,729 or 6,076,373 all of which are incorporated in their entirety herein by reference.

Generally such sets of transparent glass glazing panels for mounting on an automobile vehicle can include: a windshield, front side windows, rear side windows, and a rear window. For panels in such a set at least one of the front side windows, rear side windows; or rear window has the glazing panel of medium LTA glass composition of the present invention. In a particular embodiment of the invention, the transparent glass glazing panel set for mounting on an automobile vehicle, at least one and preferably both of the front side windows and/or rear side windows and/or rear window has the glass glazing panel with a glass composition that is blue-colored, and infrared and ultraviolet radiation absorbing, glass having a luminous transmission under illuminant A of 40 to 60 percent and more suitably 45 to 55 percent. In another suitable embodiment the set includes: i) a windshield, ii) front side windows, iii) rear side windows; and iv) a rear window, wherein the panels of ii), iii) and iv) all are blue-colored, and infrared and ultraviolet radiation absorbing, glass. Also at least one of the sets of panels of ii) and iii) have a luminous transmission under illuminant A of 40 to 60, preferably 45 to 55 percent. In addition and at least one of the set of panels of iii) and iv) have a luminous transmission under illuminant A in the range of 20 to 45 percent. A suitable example of such a lower LTA type of privacy glass is a blue colored, privacy, infrared and ultraviolet radiation absorbing glass composition comprising a base glass portion including:

| | |
|---|---|
| $SiO_2$ | 66 to 75 percent by weight, |
| $Na_2O$ | 10 to 20 percent by weight, |
| CaO | 5 to 15 percent by weight, |
| MgO | 0 to 5 percent by weight, |
| $Al_2O_3$ | 0 to 5 percent by weight, |
| $K_2O$ | 0 to 5 percent by weight, | and a primary solar radiation absorbing and colorant portion including:

| | |
|---|---|
| total iron | 0.65 to 2 percent by weight, |
| FeO | 0.15 to 0.65 percent by weight, |
| CoO | 90 to 250 ppm, |
| $TiO_2$ | 0 to 0.9 percent by weight, and |
| $Er_2O_3$ | 0.01 to 3 percent by weight, | the glass having a luminous transmittance (LTA) of greater than 20% up to 45%, and a color characterized by a dominant wavelength in the range of 479 to 491 nm and an excitation purity of at least 4% at a thickness of 0.160 inches (4.06 mm).

Also the glass of the present invention can be part of a laminated transparency comprised of two glass plies bonded together by an interlayer of plastic, such as with a typical windshield construction. Although it should be understood that the invention can apply to transparencies having two plastic plies or any combination involving numerous glass and/or plastic plies or a single (monolithic) ply of glass or plastic. The glass of the present invention could serve as one or more plies of glass in such laminate constructions. Such laminated transparencies could be laminated automotive sidelites, or even automotive sunroofs or skylights for commercial or residential construction. Also the ply or plies of a monolithic or laminated structure including the glass that can be annealed as for example with windshields, or tempered or heat strengthened, i.e. partially tempered, as for example sidelites.

Other variations as are known to those skilled in the art can be resorted to without departing from the scope of the invention as defined by the claims that follow.

What is claimed is:

1. A blue colored, infrared and ultraviolet radiation absorbing glass substrate comprising a glass composition comprising a base glass portion and a glass colorant portion, wherein the base glass portion is a soda-lime-silica base portion, and the glass colorant portion is selected to provide a glass having chromaticity coordinates of a* in the range of −2 to −11 and b* in the range of −1 to −15, and a luminous transmittance of 35 to less than 70%, at a reference thickness of 0.160 inch (4.06 mm), wherein the colorant portion comprises:

total iron, expressed as $Fe_2O_3$, in the range of 0.60 to 2.0 weight percent (wt %);
   CoO in the range of 30 to 250 parts per million (ppm);
   $Er_2O_3$ in the range of 0.01 to 3 wt %;
   $TiO_2$ in the range of 0 to 0.9 wt %,
   $Nd_2O_3$ in the range of 0 to 3 wt %, and
   $Cr_2O_3$ in the range of 5 to 200 ppm,
   wherein the wt % and the ppm are based on the final glass composition.

2. The glass substrate according to claim 1, wherein the soda-lime-silica base portion is selected from the following Groups:

Group 1: the base portion comprises:

| | Weight Percent |
|---|---|
| $SiO_2$ | 66 to 75; |
| $Na_2O$ | 10 to 20; |
| CaO | 5 to 15; |
| MgO | 0 to 5; |
| $Al_2O_3$ | 0 to 5, |
| $K_2O$ | 0 to 5, and |

Group 2: the base portion comprises:

| | Weight Percent |
|---|---|
| $SiO_2$ | 66 to 75; |
| $Na_2O$ | 10 to 20; |
| CaO | 5 to 15; |
| MgO | 0 to 5; |
| $Al_2O_3$ | 0 to 5; |
| $K_2O$ | 0 to 5, and |
| $B_2O_3$ | greater than 0 to 5 | wherein the wt % are based on the final glass composition.

3. The glass substrate according to claim 1, wherein the glass composition has a color characterized by a dominant wavelength in the range of 479 to 495 nanometers and an excitation purity of at least 8% at a thickness of 0.160 inches.

4. The glass substrate according to claim 1 wherein the wt % the total iron is in the range of from greater than 0.9 to 1.3 wt %.

5. The glass substrate according to claim 1 wherein the CoO concentration is in the range of 60 to 130 ppm.

6. The glass substrate according to claim 1 wherein the redox is in the range of 0.35 to 0.55.

7. The glass substrate according to claim 1 wherein the glass composition has a total solar ultraviolet transmittance (TSUV) of 40 percent or less, a total solar infrared transmittance (TSIR) of 25 percent or less and a total solar energy (TSET) transmittance of 40 percent or less, and the color of the glass is characterized by a dominant wavelength in the range of 482 to 487 nanometers and an excitation purity of 8 to 30 percent at a thickness of 0.160 inches (4.06 mm).

8. The glass substrate according to claim 1 wherein the $Er_2O_3$ has a wt % in the range of 0.05 to 1 wt %.

9. The glass substrate according to claim 1 wherein the $Er_2O_3$ has a wt % in the range of 0.05 to 1 wt % and the $Cr_2O_3$ has a ppm in the range of 10 to 100 ppm.

10. The glass substrate according to claim 1 comprising CuO in the range of 0.001 to 0.3 wt %.

11. The glass substrate according to claim 10 wherein the $Er_2O_3$ has a wt % in the range of 0.05 to 1 wt % the $Cr_2O_3$ has a ppm in the range of 10 to 100 ppm and the CuO has a wt % in the range of 0.01 to 0.2 wt %.

12. A blue colored, infrared and ultraviolet radiation absorbing glass composition having a composition comprising a base glass portion selected from one of the following Groups:

Group 1: the base glass portion comprises:

| | Weight Percent |
|---|---|
| $SiO_2$ | 66 to 75; |
| $Na_2O$ | 10 to 20; |
| CaO | 5 to 15; |
| MgO | 0 to 5; |
| $Al_2O_3$ | 0 to 5, |
| $K_2O$ | 0 to 5, and |

Group 2: the base glass portion comprises:

| | Weight Percent |
|---|---|
| $SiO_2$ | 66 to 75; |
| $Na_2O$ | 10 to 20; |
| CaO | 5 to 15; |
| MgO | 0 to 5; |
| $Al_2O_3$ | 0 to 5; |
| $K_2O$ | 0 to 5, and |
| $B_2O_3$ | greater than 0 to 5; | and a primary solar radiation absorbing and colorant portion consisting essentially of:

total iron, expressed as $Fe_2O_3$, in the range of 0.60 to 2.0 weight percent (wt %);
   CoO in the range of 30 to 100 parts per million (ppm);
   $Er_2O_3$ in the range of 0.01 to 3 wt %;
   $TiO_2$ in the range of 0 to 0.9 wt %, and
   $Nd_2O_3$ in the range of 0 to 3 wt %;

wherein the glass has a redox in the range of 0.4 to 0.58, and wherein at a thickness of 0.160 inches, the glass has a luminous transmittance (LTA) of 35% up to 70%; a color characterized by a dominant wavelength in the range of 482 to 487 nanometers and an excitation purity ranging from 8 to 30 percent; a total solar ultraviolet transmittance (TSUV) of 40 percent or less; a total solar infrared transmittance (TSIR) of 25 percent or less; and a total solar energy (TSET) transmittance of 40 percent or less.

13. The composition as in claim 12 wherein, the FeO concentration is 0.20 to 0.50 wt %.

14. The composition as in claim 12 wherein the $TiO_2$ concentration is 0 to 0.5 wt %.

15. The composition as in claim 12 wherein the LTA is in the range of 45 to 55 wt %.

16. Transparent glass glazing panel set for mounting on an automobile vehicle, comprising:
   a windshield;
   front side windows;
   rear side windows, and
   a rear window,
wherein at least one of the front side windows, rear side windows; or rear window has the glass composition of claim 12.

17. A blue colored, infrared and ultraviolet radiation absorbing glass substrate comprising a glass composition comprising a base glass portion and a glass colorant portion, wherein the base glass portion is a soda-lime-silica base portion, and the glass colorant portion is selected to provide a glass having chromaticity coordinates of a* in the range of −2 to −11 and b* in the range of −1 to −15, and a luminous transmittance of 35 to less than 70%, at a reference thickness of 0.160 inch (4.06 mm), wherein the colorant portion comprises:
   total iron, expressed as $Fe_2O_3$, in the range of 0.60 to 2.0 weight percent (wt %);
   CoO in the range of 30 to 250 parts per million (ppm);
   $Er_2O_3$ in the range of 0.01 to 3 wt %;
   $TiO_2$ in the range of 0 to 0.9 wt %,
   $Nd_2O_3$ in the range of 0 to 3 wt %, and
   NiO in the range of 1 to 100 ppm,
   wherein the wt % and the ppm are based on the final glass composition.

18. The glass substrate according to claim 17 wherein $Er_2O_3$ has a wt % in the range of 0.05 to 1 wt % and the NiO has a ppm of 5 to 50 ppm.

* * * * *